United States Patent [19]

Takeda et al.

[11] Patent Number: 4,971,808
[45] Date of Patent: Nov. 20, 1990

[54] HIGH ETHANOL COOKING COMPOSITION PRODUCED BY FERMENTATION OF A WORT

[75] Inventors: Kazushi Takeda, Itoshima; Kazumasa Nokura, Sashima, both of Japan

[73] Assignee: Asahi Kasei Kogyo Kabushiki Kaisha, Osaka, Japan

[21] Appl. No.: 208,046

[22] Filed: Jun. 17, 1988

[51] Int. Cl.$^5$ .......................... A25L 1/22; C12C 11/04
[52] U.S. Cl. ........................................ 426/16; 426/11; 426/650
[58] Field of Search ............................ 426/16, 11, 650

[56] References Cited

U.S. PATENT DOCUMENTS

| | | | |
|---|---|---|---|
| 4,021,580 | 5/1977 | Raymond et al. | 426/16 |
| 4,507,325 | 3/1985 | Geiger | 426/16 |
| 4,590,085 | 5/1980 | Sidoti et al. | 426/582 |

OTHER PUBLICATIONS

Fahy, Carol, "Cooking with Beer" 1972 Elm Tree Books p. 79.
E. Pfisterer et al., "High Gravity Brewing", The Brewers Digest, Jun. 1976.

*Primary Examiner*—Donald E. Czaja
*Assistant Examiner*—Evan Fenderman
*Attorney, Agent, or Firm*—Birch, Stewart, Kolasch & Birch

[57] ABSTRACT

There is disclosed a novel cooking composition produced by the fermentation of a wort, which contains not only a high amount of ethanol, but also high amounts of flavor components. The cooking composition of the present invention is useful as a seasoning for providing excellent flavor and taste characteristic of a malt to a food. The cooking composition of the present invention can be produced by fermenting a wort with a yeast, while continuously or discontinuously adding a carbohydrate to the wort, and allowing the resultant fermented wort to stand to mature and stabilize the fermented wort.

12 Claims, 1 Drawing Sheet

FIGURE
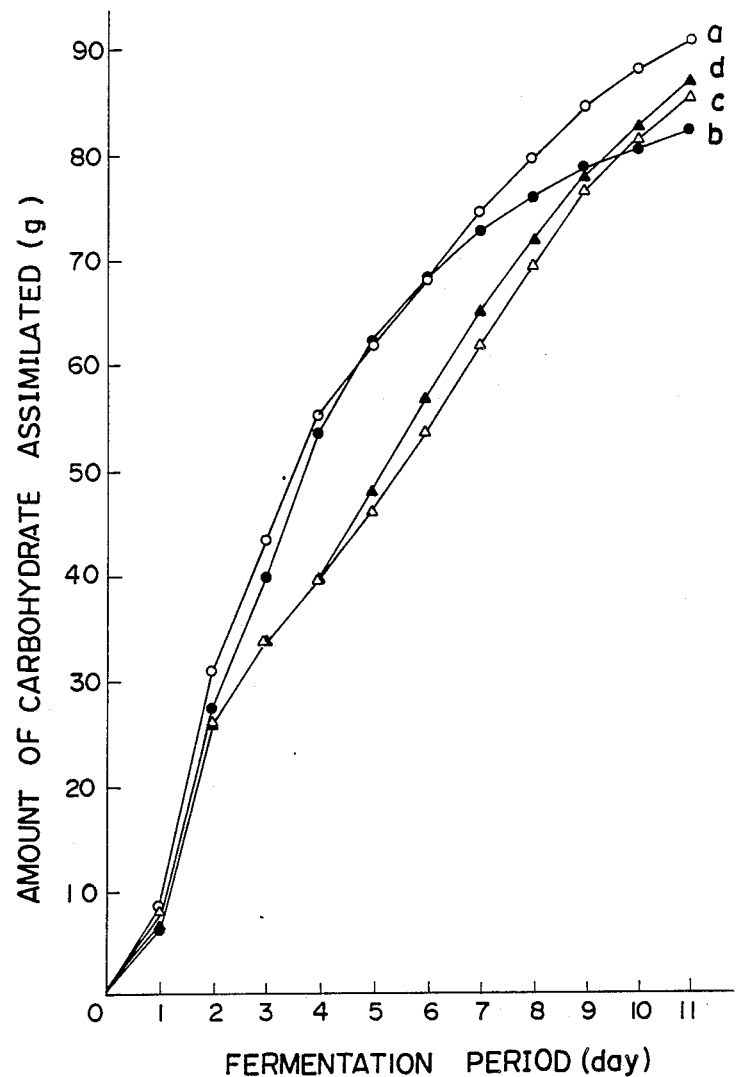

HIGH ETHANOL COOKING COMPOSITION PRODUCED BY FERMENTATION OF A WORT

BACKGROUND OF THE INVENTION

1. Field of The Invention

The present invention relates to a cooking composition. More particularly, the present invention relates to a cooking composition having high contents of ethanol and flavor components. The cooking composition which is derived from a fermented malt beverage is useful as a seasoning for providing excellent flavor and taste to foods.

2. Discussion of Related Art

Beer is a product derived from the fermentation of a wort, which has a flavor and bitter taste from hops and which causes a thirst quenching sensation. Beer is the most popular alcoholic beverage. Conventionally, various fermented liquors such as a wine, a mirin (seasoning sweet sake) and a refined sake are used as seasonings for cooking. By the use of the above-mentioned fermented liquors for cooking, the following effects can be obtained:

(1) the effect for improving the flavor and taste of a food due to the natural volatile components of the liquor,
(2) the masking effect of an undesirable smell of a food,
(3) the effect of increasing the gloss and glaze of a food due to the extract components of the liquor,
(4) the effect of giving a roast flavor by heating to a food, and
(5) the effect of prolonging the preservable period of a food due to the ethanol present.

Beer has the excellent flavor and taste characteristic of a fermented malt beverage. Its flavor and taste characteristics are derived from a wort that is an infusion of a malt extract and they are not possessed by the above-mentioned other types of fermented liquors. Therefore, beer is also expected to be capable of being used as a seasoning for cooking. A regular beer is available on the market. However, the concentrations of the extract components of the regular beer are limited so as not to spoil the crispness of the beer as an alcoholic beverage. For example, the total nitrogen content is not more than 800 ppm and the carbohydrate content is not more than 5 w/v%. Further, the ethanol content of a regular beer is as low as about 4 to 5 %. Such regular beers do not have the above-mentioned cooking effects. Moreover, the taste from hops is too strong for beer to be used as a seasoning.

Heretofore, a method for producing beer by high gravity brewing in which a high concentration beer is obtained as an intermediate product is known. As to this method, reference may be made to, for example, The Brewers Digest, vol. 51, June, p.34 (1976). High gravity brewing is a method in which a high concentration wort is fermented to obtain a high concentration beer. The high concentration beer is then diluted with water in order to obtain a beer comparable to a regular beer with respect to not only alcoholic content and extract component concentrations but also flavor and taste. The above-mentioned high gravity brewing method is advantageous from the standpoint of economy because a beer having properties comparable to those of a regular beer can be produced at low cost.

On the other hand, the high gravity brewing method is also used for producing the so-called light beer (Japanese patent application laid-open specification Nos. 56-121482 and 56-148281). Light beer has extract component concentrations and an alcoholic content which are less than those of a regular beer, but has a flavor and taste comparable to those of a regular beer. Particularly, light beer is produced by blending a high concentration beer prepared by the high gravity brewing method and a low concentration beer prepared from a wort having low extract component contents.

As apparent from the above, the high concentration beer is obtained as an intermediate. The high concentration beer is prepared by fermenting a wort having an extract concentration as high as 14° to 18° P. The high concentration beer contains ethanol, esters, extract components, etc. in relatively large amounts as compared to a regular beer. However, even the amounts of the ethanol, esters, extract components, etc. contained in the high concentration beer are not sufficient for exerting the above-mentioned cooking effects. Accordingly, neither the commercially available regular beer nor the above-mentioned high concentration beer is suitable for use as a seasoning for cooking.

SUMMARY OF THE INVENTION

The present inventors have made extensive and intensive studies with a view toward developing a cooking composition, which not only contains a flavor and taste derived from a fermented malt beverage but also would have the above-mentioned cooking effects. As a result, it has unexpectedly been found that a composition produced by the fermentation of a wort, which contains ethanol, esters and extract components in high concentrations, and which has a flavor and taste derived from a fermented malt beverage, can give excellent cooking effects. Further, it has also been found that such a composition having excellent cooking effects can be produced by fermenting a wort having high concentrations of extract components, while continuously or discontinuously adding carbohydrates assimilable to a yeast to the fermentation system in such an amount as can be assimilated by the yeast used, and after the fermentation, allowing the fermented wort to stand to mature and stabilize the fermented wort. Based on these novel findings, the present invention has been completed.

It is, therefore, an object of the present invention to provide a novel cooking composition having not only the good flavor and taste derived from a fermented malt beverage, but also have excellent cooking effects.

The foregoing and other objects, features and advantages of the present invention will be apparent to those skilled in the art from the following detailed description and appended claims taken in connection with the accompanying drawing

BRIEF DESCRIPTION OF THE DRAWINGS

In the drawing:

The FIGURE is a graph showing the relationships between the amounts of carbohydrate assimilated by a yeast and the fermentation periods of time in the fermentations which are conducted while adding carbohydrates assimilable to a yeast in various manners.

DETAILED DESCRIPTION OF THE INVENTION

According to the present invention, there is provided a cooking composition produced by the fermentation of a wort comprising:
(1) an ethanol content of about 8 to about 20 v/v%, (2) a carbonyl compound content of about 10 to about 30 ppm in terms of the amount of acetoaldehyde,
(3) an ester content of about 30 to about 300 ppm in terms of the amount of ethyl acetate,
(4) a total carbohydrate content of about 2 to about 10 w/v%, and
(5) a total nitrogen content of about 500 to about 1500 ppm, and having the following properties:
(6) an acidity of about 0.5 to about 4.0 in terms of the volume (ml) of 1/10 N NaOH required for neutralizing 10 ml of the cooking composition,
(7) a bittering unit of 0 to about 10.0 B.U. in terms of the value as obtained by the EBC method,
(8) a pH of about 4.0 to about 5.0, and
(9) an optical density of about 0.45 to about 20.0 in terms of the value as obtained by the measurement at 430 nm using a 10 mm-thick cell.

The cooking composition of the present invention contains ethanol, edible carbonyl compounds, edible esters, edible nitrogen-containing compounds and carbohydrates. Examples of edible carbonyl compounds include acetaldehyde, glyoxal, methylglyoxal, acetoin, 5-hydroxymethyl furfural and the like. Examples of edible esters include ethyl acetate, isoamyl acetate, ethyl caproate, ethyl caprylate, ethyl caprate, β-phenylethyl acetate, ethyl butyrate and the like. Examples of edible nitrogen-containing compounds include a protein, a peptide and an amino acid. Examples of carbohydrates include sucrose, fructose, glucose, starch and the like. Further, the cooking composition contains small amounts of higher alcohols and polyphenols. However, in the present invention, the components of the cooking composition is represented by the ethanol content, carbonyl compound content in terms of the amount of acetoaldehyde, ester content in terms of the amount of ethyl acetate, total carbohydrate content and total nitrogen content as described above under items (1) to (5). That is, the cooking composition of the present invention has an ethanol content of about 8 to about 20 v/v%, a carbonyl compound content of about 10 to about 30 ppm in terms of the amount of acetoaldehyde, an ester content of about 30 to about 300 ppm in terms of the amount of ethyl acetate, a total carbohydrate content of about 2 to about 10 w/v%, and a total nitrogen content of about 500 to about 1500 ppm.

The cooking composition of the present invention has various physical and chemical properties, that is, it has an acidity of about 0.5 to about 4.0 in terms of the volume (ml) of 1/10 N NaOH required for neutralizing 10 ml of the cooking composition, a bittering unit of 0 to about 10.0 B.U. in terms of the value as obtained by the EBC method, a pH value of about 4.0 to about 5.0, and an optical density of about 0.45 to about 20.0 in terms of the value as obtained by the measurement at 430 nm using a 10 mm-thick cell.

The contents of the ethanol, carbonyl compounds, esters, total carbohydrate and total nitrogen in the cooking composition of the present invention and the physical properties of the cooking composition of the present invention may be determined by the methods as mentioned below.
(1) The ethanol content may be determined by the method for the quantitative analysis of alcohol as described in Analytica-EBC III (1975), E-55, published by Brauerei- und Getränke-Rundschau, Switzerland.
(2) The carbonyl compound content may be determined in terms of the amount of acetoaldehyde by the method for measuring an aldehyde content as described in Alcohol Handbook published by The Fermentation Society, Japan, p.131–132.
(3) The ester content may be determined in terms of the amount of ethyl acetate by the spectrophotometric method for the quantitative analysis of ethyl acetate as described in Bunsekikagaku-Binran (Handbook of Analytical Chemistry), third edition (1981), published by Maruzen, Japan, p.511.
(4) The total carbohydrate content may be determined by the phenol-sulfuric acid method as described, for example, in Dubois et al., Anal. Chem. 28, 350(1956) and Nature,168, 107(1951).
(5) The total nitrogen content may be determined by the Kjeldahl method as described, for example, in Bunsekikagaku-Binran (Handbook of Analytical Chemistry), third edition (1981), published by Maruzen, Japan, p. 218 and Methods of Analysis of the American Society of Brewing Chemists, published by the American Society of Brewing Chemists (1976).
(6) The acidity may be determined in terms of the volume (ml) of 1/10 N NaOH required for neutralizing 10 ml of the cooking composition by the method described in Shokuhinbunseki Handbook (Handbook of Food Analysis), second edition, p. 546, published by Kenpakusha, Japan.
(7) The bittering unit (B.U.) may be determined in terms of the value as obtained by the EBC method described in Analytica-EBC III (1975), E-60, published by Brauerei- und Getränke-Rundschau, Switzerland.
(8) The pH may be measured using a pH meter.
(9) The optical density may be determined at 430 nm using a spectrophotometer and a 10 mm-thick cell. In the case where the color of the cooking composition is too deep, the composition is diluted with water to such an extent that the resultant dilution has an optical density which can easily be measured with accuracy, and subjected to measurement of the optical density, and the obtained value is multiplied by the number representing the volume ratio of the dilution to the original cooking composition to obtain the desired optical density.

The cooking composition of the present invention is produced by the fermentation of a wort. Therefore, in the cooking composition of the present invention, polyphenols and melanoidins are copresent. For example, anthocyanogen which is a representative substance of polyphenols, and 5-hydroxymethyl furfural which is a representative substance of melanoidins, are copresent in the present cooking composition in amounts of about 14 to about 80 ppm and about 9 to about 56 ppm, respectively.

The cooking composition of the present invention may be produced by a method which comprises:
(a) fermenting a wort with a yeast, while continuously or discontinuously adding carbohydrates in such an amount as is able to be assimilated by the yeast, obtaining a fermented wort, and
(b) allowing the fermented wort to stand for a period sufficient to mature and stabilize the fermented wort.

The wort to be fermented for producing the composition of the present invention is a high extract content wort that generally contains an extract at a concentration of about 12° to 40° P. preferably 16° to 30° P. The extract is a soluble solid matter including carbohydrates and nitrogen-containing compounds. The extract content of a wort may be measured by the method described in Methods of Analysis of the American Society of Brewing Chemists (1976), published by American Society of Brewing Chemists, Beer-6. The unit "° P." as used herein means the extract content of a wort expressed in terms of the value of the sugar concentration (wt%) of an aqueous sucrose solution which has the same specific gravity as that of the wort. The wort to be used in the present invention may be prepared from a malt only. Alternatively, the wort may also be prepared from a malt and adjuncts such as rice and starch. However, from the viewpoint of increasing the ester content and alcohol content in order to enhance flavor and taste characteristic of the fermented malt beverage, it is preferable to restrict the amount of the adjuncts to be added to a level as low as possible. Generally, the adjuncts may be used in an amount of not more than about 50 % by weight, preferably 20 to 40 % by weight based on the weight of the malt.

The amount of a malt to be used for preparing a wort may be varied according to the extract content of a wort to be prepared, the properties of a malt to be used and the conditions for preparing a wort. In preparing a wort, a malt and water are generally mixed in a weight ratio of about 14/100 to 60/100.

The preparation of the wort may be carried out by a customary mashing method which is used for brewing. With respect to the mashing method, reference may be made to, for example, Malting and Brewing Science (1971), published by Chapman and Hall Ltd., London. In the case of the brewing, hops are added after the mashing process. In the case of the production of the composition of the present invention, hops may generally not be added. But, if desired, hops may be added in such a small amount that bits of hoppy flavor and bitter taste can be imparted to the cooking composition of the present invention as hidden flavor and taste. The amount of hops which may be added is generally not more than about 0.8 w/v% based on the resultant wort. In the case where the amount of a hop is higher than 0.8 w/v%, the produced cooking composition has a disadvantage in that when the cooking composition is used for cooking, the flavor and bitter taste from hops in the cooked food would become too strong.

The thus obtained wort is fermented with a yeast as follows. First, to the wort is added a yeast. As the yeast, there may be used any of yeasts belonging to the genus Saccharomyces as long as it is capable of alcohol fermentation. Examples of yeasts include a brewing yeast, a wine yeast, a sake yeast and the like. The fermentation may generally be carried out in a fermentation tank at a temperature of 10°2 to 20° C., preferably 13° to 17° C. The fermentation temperature of lower than 10° C. is not preferable because the activity of a yeast is lowered so that a prolonged period of time is required for fermentation and, sometimes, the inactivation of a yeast occurs so that the fermentation cannot be performed completely. On the other hand, the fermentation temperature of higher than 20° C. is also not preferable because fermentation by-products such as aldehydes and higher alcohols are likely to be produced in too large of an amount so that the flavor and taste of the produced cooking composition become undesirable.

For producing a cooking composition of the present invention, it is essential to add at least one type of carbohydrate in an amount sufficient to be assimilated by the yeast during the fermentation of the wort. Examples of carbohydrates include refined sugar, crude sugar, invert sugar, malt extract and the like. The malt extract is a concentrate of a wort. The carbohydrate as such may be added. Alternatively, the carbohydrate may be added in the form of an aqueous solution. In the case of an aqueous carbohydrate solution, the carbohydrate concentration may generally be about 35 to about 75 w/v%. The amount of the carbohydrate to be added may generally be 30 w/w% to 100 w/w% in terms of the amount of sucrose based on the amount of the malt employed. By the addition of the carbohydrates during the fermentation in such an amount as mentioned above, the fermentation degree can be increased to thereby obtain a cooking composition of the present invention having an ethanol concentration as high as 8 to 20 v/v% and being rich in flavor and taste from a malt. The carbohydrate may be added directly to the wort in the fermentation tank. Alternatively, the carbohydrate may be added in such a manner that an aliquot of the wort is taken out of the fermentation talk and mixed with the carbohydrate to dissolve the carbohydrate in the aliquot of the wort, and the resultant mixture is added to the wort in the fermentation tank.

The addition of the carbohydrate to a wort may be conducted continuously during the fermentation. Alternatively, the carbohydrate may be added all at once or incrementally. As the method for adding the carbohydrate all at once or incrementally, there may be employed, for example:

(i) a method in which the carbohydrate to be added is divided into a plurality of aliquots of equal amounts and added as from the primary stage of fermentation aliquot by aliquot.

(ii) a method in which the whole amount of the carbohydrate to be added is added at primary stage of fermentation all at one time.

(iii) a method in which the carbohydrate to be added is divided into a plurality of aliquots of equal amounts and added as from the middle stage of fermentation aliquot by aliquot.

(iv) a method in which the whole amount of the carbohydrate to be added is added at the middle stage of fermentation all at one time.

The "primary stage of fermentation" used herein means the period of from the initiation of the fermentation to the 2nd day of the fermentation. The "middle stage of fermentation" used herein means the period of from the 3rd day to the 6th day from the initiation of the fermentation.

In the case of methods (i) and (iii), that is, when the carbohydrate is added aliquot by aliquot, it is advantageous for increasing the fermentation degree that the carbohydrate be divided into 3 to 20 aliquots, preferably 5 to 15 aliquots, and the aliquots of the carbohydrate be added at intervals of 12 to 36 hours, preferably 24 hours.

Among above-mentioned methods (i) to (iv), method (i) is most preferable from the standpoint that the highest degree of fermentation can be attained. This is apparent from the data shown in the Figure. The Figure shows the relationships between the amounts of carbohydrate assimilated and the fermentation periods of time in the fermentations which are conducted while adding carbohydrates in various manners. In the Figure, experiments (a) to (d) correspond to above-mentioned methods (i) to (iv), respectively. In each of experiments (a) to (d), 400 ml of a wort prepared from a malt only and having an extract content of 16° P. is fermented with a yeast at 15° C., and 44 g in total amount of sugar is added as an additional carbohydrate during the fermentation in the manner as described below. In experiment (a), 55.5 g of sugar is added at the initiation of fermentation and each day from the 1st day to the 7th day of the fermentation at intervals of 24 hours. In experiment (b), the whole amount of the sugar is added all at one time at the time of the initiation of fermentation. In experiment (c), 11 g of sugar is added each day from the 4th day to the 7th day of the fermentation at intervals of 24 hours. In experiment (d), the whole amount of the sugar is added all at one time on the 4th day of the fermentation. As apparent from the results shown in the Figure, the amount of carbohydrate assimilated is the highest in experiment (a), namely method (i). This fact shows that the highest degree of fermentation can be attained by above-mentioned method (i).

Under the above-mentioned conditions, the fermentation is conducted. The fermentation period may generally be 8 to 20 days, preferably 10 to 15 days. The fermentation is generally conducted without being stirred, but the fermentation may also be conducted with stirring. However, at the time when the carbohydrate is added to a wort, it is preferred to sufficiently admix the carbohydrate with the wort by stirring. The fermentation process is called "primary fermentation". The fermented wort obtained by the primary fermentation, namely the fermented wort has an ethanol content of about 8 v/v% or more, preferably about 12 v/v% or more, and also contains by-products such as hydrogen sulfide and diacetyl in such high amounts as will provide an immature flavor and taste, such that it would be undesirable or use as a seasoning. In order to decrease the amounts of the above-mentioned by-products, the fermented wort is subjected to maturation and stabilization as follows.

After completion of the primary fermentation, the fermented wort is cooled to a of 3° to 5° C. and transferred into a lagering tank. Then, the fermented wort is allowed to stand for a period of time sufficient to mature and stabilize the fermented wort. The process for maturation and stabilization is called "secondary fermentation". The secondary fermentation may generally be conducted at a temperature of −2° to5° C. In the case of ordinary beer brewing, the fermented wort is carbonated during the secondary fermentation. The carbonatation has an effect on preventing the flavor deterioration caused by oxidation of a beer at the time of drinking, which causes the thirst quenching sensation to be lowered. On the other hand, in the case of the cooking composition of the present invention, this would be no problem even if such an oxidation change occurs, because the cooking composition of the present invention is not an alcoholic beverage which should be strictly controlled with respect to the prevention of oxidation and the maintenance of a thirst quenching sensation. Therefore, when the cooking composition of the present invention is produced, it is not always required to carbonate the fermented wort during the secondary fermentation. However, for preserving the cooking composition for a long period of time, it is preferred that the fermented wort be carbonated At the initial stage of the secondary fermentation, the yeast is still active and causes the gas formation. With the lapse of time in the secondary fermentation, the temperature of the fermented wort is decreased to about −1° to −2° C. and the activity of the yeast is also gradually decreased. Finally, the fermenting action of the yeast ceases and the fermentation degree becomes the highest.

During the secondary fermentation, volatile odor components which are by-products of the primary fermentation, such as hydrogen sulfide, are volatilized off with the carbon dioxide gas formed in the secondary fermentation. Further, the by-produced odor components such as diacetyl undergo reduction by the action of a yeast so that the concentrations of the diacetyl are decreased. Instead, the concentrations of desirable flavor components such as acetic esters are increased.

The period of time for the secondary fermentation is not critical and should not be specifically restricted. Generally, the secondary fermentation may be conducted for about a week to about 6 months.

After the completion of the secondary fermentation, the fermented wort may be subjected to filtration and pasteurization according to a customary method which is used for brewing.

Thus, there is obtained a cooking composition of the present invention having the unique properties as mentioned above. The cooking composition of the present invention may be charged in an appropriate container. The thus obtained cooking composition of the present invention contains increased amounts of natural flavor components and has excellent flavor and taste which are characteristic of a fermented malt beverage and, therefore, is desirable for use as a seasoning.

To the above-obtained cooking composition may be added at least one additive selected from the group consisting of a seasoning an edible organic oil.

Examples of seasonings include salt; vinegar; miso; soy sauce; an artificial seasoning such as sodium glutamate, inosine-5'-monophosphate disodium salt, guanosine-5'-monophosphate disodium salt, disodium succinate and trisodium citrate; a natural seasoning such as a meat extract, a fish extract, a plant extract and hydrolysates thereof; an amino acid such as glycine, alanine and lysine; spice such as pepper, red pepper, mustard, ginger and garlic; and sugar such as sucrose, fructose and maltose.

Examples of edible organic acids include acetic acid, citric acid, succinic acid and malic acid.

Examples of edible oils include sesame oil and salad oil.

The amount of the additive to be added to the composition of the present invention is not limited and may be varied according to the type of the additive. Hereinbelow, the amounts of additives which may generally be added to the composition of the present invention are described. The amounts of the additives described below are represented by w/v% based on the volume of the composition of the present invention to which the additive is to be added. In the case of salt, the amount thereof may be about 0.01 to about 40 w/v%. In the cases of vinegar, miso and soy sauce, the amounts thereof may each independently be about 0.01 to about 50 w/v%. In the case of sodium glutamate, the amount thereof may be about 0.001 to about 40 w/v%. In the cases of nucleic acids such as inosine-5'-monophosphate disodium salt and guanosine-5'-monophosphate disodium salt, the amounts thereof may each independently be about 0.001 to about 20 w/v% In the cases of disodium succinate and trisodium citrate, the amounts thereof may each independently be about 0.001 to about 50 w/v%. In the cases of a natural seasoning, the amount thereof may be about 0.01 to about 50 w/v%. In the case of an amino acid, the amount thereof may be about 0.01 to about 50 w/v%. In the case of spice, the amount thereof may be about 0.0001 to about 10 w/v%.

In the case of sugar, the amount thereof may be about 0.01 to about 150 w/v%. In the case of an edible organic acid, the amount thereof may be about 0.01 to about 20 w/v%. In the case of an edible oil, the amount thereof may be about 0.01 to about 50 w/v%.

The cooking composition of the present invention has the following advantages.

(1) The present cooking composition contains increased amounts of various esters including esters of higher alcohols which are essences of good flavor and taste, and has flavor and taste characteristic of a fermented malt beverage. Therefore, when the present cooking composition is used as a seasoning for cooking, the flavor and taste of the cooked food can be improved markedly.

(2) The present cooking composition has less of a hop taste and a lower bittering unit as compared to beer. Therefore, the present cooking composition can be used in a relatively large amount for cooking various foods.

(3) The present cooking composition contains various esters and carbonyl compounds in relatively large amounts. These compounds react with amines of meats and fishes during the cooking by heating. Therefore, the undesirable odor derived from amines of meats and fishes can be masked efficiently.

(4) The present cooking composition has an effect of bracing a taste of a food due to polyphenols present in the composition.

(5) Natural components which are desirable for providing good flavor and taste and can be eluted out by ethanol are present in a food material. By the use of a cooking composition of the present invention which contains ethanol in a large amount, such natural components can be efficiently eluted out of the food material to give excellent flavor and taste to a cooked food.

(6) Owing to the high ethanol content of the present cooking composition, when the composition is used for cooking a food, the preservation period of the obtained food can be prolonged.

(7) The present cooking composition is biologically stable due to the high ethanol content.

DETAILED DESCRIPTION OF THE PREFERRED EMBODIMENTS

The present invention will now be described in greater detail with reference to the following Examples that by no means limit the scope of the present invention.

EXAMPLE 1

To 18 kg of a malt is added 115 l of water, and the resultant mixture is subjected to brewing by a mashing method described in Malting and Brewing Science (1971), published by Chapman and Hall Ltd., London, to thereby obtain 70 l of a wort having an extract content of 16.7° P. Then, a bottom fermentation yeast (a brewing yeast strain which is publicly available from Hefe Bank of Technische Universität München, West Germany) is inoculated to the wort, and the resultant wort is fermented at 15° C. for 10 days. During the fermentation, 1.18 kg of sugar is added to the wort 7 times from the 24th hour counted from the initiation of the fermentation at intervals of 24 hours. After completion of the fermentation, the fermented wort is cooled to 5° C. and transferred into a lager tank and allowed to stand still for 1 month under atmospheric pressure to thereby mature and stabilize the fermented wort. The resultant fermented wort is filtered to obtain 56 l of a cooking composition of the present invention. The thus obtained cooking composition is analyzed with respect to the contents of the components and the physical and chemical properties indicated in Table 1. Except for the analyses of the original extract content, apparent extract content, real extract content, apparent degree of fermentation and real degree of fermentation, the analyses are carried out by the methods described before. The original extract content, apparent extract content and real extract content are determined according to the methods respectively described in items Beer-6, Beer-3 and Beer-5 of Methods of Analysis of the American Society of Brewing Chemists (1976), published by American Society of Brewing Chemists. The apparent degree of fermentation and real degree of fermentation are determined according to the method described in item Beer-6 of Methods of Analysis of the American Society cf Brewing Chemists (1976). The results are shown in Table 1.

EXAMPLE 2

To 18 kg of a malt and 0.09kg of hops is added 115 l of water, and the resultant mixture is subjected to brewing by the same mashing method as in Example 1, to thereby obtain 70 l of a wort having an extract content of 16.7° P. Then, the same bottom fermentation yeast as used in Example 1 is inoculated to the wort, and the resultant wort is fermented at 15° C. for 10 days. During the fermentation, 1.18 kg of sugar is added to the wort 7 times from the 24th hour counted from the initiation of the fermentation at intervals of 24 hours. After completion of the fermentation, the fermented wort is cooled to 5° C. and transferred into a lager tank. The lager tank is bunged and allowed to stand still for 1 month to thereby mature, carbonate and stabilize the fermented wort. The resultant fermented wort is filtered to obtain 56 l of a cooking composition of the present invention. The thus obtained cooking composition is analyzed in the same manner as in Example 1. The results are shown in Table 1.

EXAMPLE 3

A wort is prepared and fermented in the same manner as in Example 1, to thereby obtain 73 kg of a fermented wort. To the fermented wort are added 1.0 kg of salt and 280 g of sodium glutamate to dissolve the salt and sodium glutamate in the fermented wort. The resultant mixture is cooled to 5° C. and transferred into a lager tank, and allowed to stand still for 1 month under atmospheric pressure to thereby mature and stabilize the mixture. The mixture is filtered to thereby obtain 56 l of a cooking composition of the present invention. The cooking composition is analyzed in the same manner as in Example 1. The results are shown in Table 1.

EXAMPLE 4

A wort is prepared and fermented in the same manner as in Example 2, to thereby obtain 73 kg of a fermented wort. To the fermented wort are added 1.0 kg of salt and 1.0 kg of a hydrolysate of a plant protein to dissolve the salt and hydrolysate in the fermented wort. The resultant mixture is cooled to 5° C. and transferred into a lager tank, and allowed to stand for 1 month under atmospheric pressure to thereby mature and stabilize the mixture. The mixture is filtered to thereby obtain 56.5 l of a cooking composition of the present invention.

The cooking composition is analyzed in the same manner as in Example 1. The results are shown in Table 1.

TABLE 1

| Analytical data | | Example No. 1 | 2 | 3 | 4 |
| --- | --- | --- | --- | --- | --- |
| Original extract | (°P) | 24.39 | 24.10 | 24.40 | 24.05 |
| Apparent extract | (%) | 1.43 | 1.39 | 1.43 | 1.38 |
| Real extract | (%) | 5.80 | 5.72 | 5.80 | 5.70 |
| Ethanol | (v/v %) | 12.86 | 12.52 | 12.50 | 12.45 |
| Apparent degree of fermentation | (%) | 94.1 | 93.0 | 92.5 | 92.7 |
| Real degree of fermentation | (%) | 76.2 | 75.0 | 75.0 | 74.5 |
| Carbonyl compounds[1] | (ppm) | 13.8 | 13.5 | 12.0 | 12.4 |
| Esters[2] | (ppm) | 96 | 92 | 89 | 88 |
| Total nitrogen | (ppm) | 1100 | 1080 | 1110 | 2060 |
| Acidity[3] | | 2.5 | 2.6 | 2.3 | 2.5 |
| Bittering unit | (B.U.) | 2.5 | 8.2 | 2.5 | 8.1 |
| Optical density[4] | | 0.50 | 0.51 | 0.49 | 0.53 |
| pH | | 4.50 | 4.48 | 4.53 | 4.52 |
| Total carbohydrates | (w/v %) | 3.0 | 3.0 | 3.50 | 3.0 |

Note:
[1] in terms of the amount of acetaldehyde
[2] in terms of the amount of ethyl acetate
[3] the volume (ml) of 1/10 N NaOH required for neutralizing 10 ml of a sample
[4] optical density (OD) measured at 430 nm using a 10 mm-thick cell

Experiment 1

Using as a seasoning the cooking composition produced in Example 2, beef stew with vegetables is prepared. The amount of the cooking composition employed is 3 w/w% based on the amount of the stew.

On the other hand, as a control, a stew is prepared in the same manner as mentioned above except that a commercially available beer (ethanol content: 4.5 v/v%) is used instead of the cooking composition of the present invention.

The above-obtained stews are subjected to a sensory test by a panel of 16 members. The sensory test is conducted by a two-sample test method in which two samples are compared by tasting and smelling. The results are shown in Table 2.

TABLE 2

| | Present invention | Control |
| --- | --- | --- |
| Good flavor | 13* | 3 |
| Well balanced taste | 14** | 2 |
| Good body | 10 | 6 |
| Delicious | 14** | 2 |

Note:
*level of significance is 5%.
**level of significance is 1%.

Experiment 2

Using as a seasoning the cooking composition produced in Example 1, a sardine meat ball is prepared. The amount of the cooking composition employed is 2.w/w% based on the amount of the sardine meat ball.

On the other hand, as a control, a sardine meat ball is prepared in the same manner as mentioned above except that an aqueous ethanol solution having an ethanol content of 12.0 v/v% and adjusted at pH 4.2 by the addition of acetic acid is used instead of the cooking composition of the present invention.

The above-obtained sardine meat balls are subjected to a sensory test by a panel of 16 members. The sensory test is conducted by a twosample test method in which two samples are compared by tasting and smelling. The results are shown in Table 3.

TABLE 3

| | Present invention | Control |
| --- | --- | --- |
| Smell of sardine is weak | 14** | 2 |
| Good flavor | 12* | 4 |
| well balanced taste | 13* | 3 |
| Delicious | 13* | 3 |

Note:
* and ** have the same meanings as in Table 2.

Experiment 3

Using as a seasoning the cooking composition produced in Example 3, a curry is prepared. The amount of the cooking composition employed is 3 w/w% based on the amount of the curry.

On the other hand, as a control, a curry is prepared in the same manner as mentioned above except that water is used instead of the cooking composition of the present invention.

The above-obtained curries are subjected to a sensory test by a panel of 16 members. The sensory test is conducted by a two-sample test method in which two samples are compared by tasting and smelling. The results are shown in Table 4.

TABLE 4

| | Present invention | Control |
| --- | --- | --- |
| Good flavor | 11 | 5 |
| Well balanced taste | 13* | 3 |
| Good body | 14** | 2 |
| Delicious | 13* | 3 |

Note:
* and ** have the same meanings as in Table 2.

Experiment 4

Using the cooking composition produced in Example 1, a seasoning soy sauce is prepared according to the recipe shown in Table 5.

TABLE 5

| Ingredient | Content (% by weight) |
| --- | --- |
| Cooking composition | 10.0 |
| Soy sauce | 29.0 |
| Sugar | 7.0 |
| Ginger juice | 3.5 |
| Lemon juice | 2.0 |

TABLE 5-continued

| Ingredient | Content (% by weight) |
| --- | --- |
| Mirin (seasoning sweet sake) | 4.2 |
| Vinegar | 5.0 |
| Garlic juice | 1.4 |
| Apple juice | 16.9 |
| Onion | 14.0 |
| Carrot | 7.0 |

On the other hand, as a control, a seasoning soy sauce is prepared in the same manner as mentioned above except that a commercially available beer (ethanol content: 4.5 v/v%) is used instead of the cooking composition of the present invention.

The above-obtained seasoning soy sauces are used as a seasoning for roast meat to prepare roast meats, and the roast meats are examined by a sensory test by a panel of 16 members. The sensory test is conducted by a two-sample test method in which two samples are compared by tasting and smelling. The results are shown in Table 6.

TABLE 6

|  | Present invention | Control |
| --- | --- | --- |
| Good flavor and taste | 12* | 4 |
| Well balanced taste | 13* | 3 |
| Good body | 10 | 6 |
| Delicious | 13* | 3 |

Note:
*has the same meaning as in Table 2.

Further, the 100 g of the seasoning soy sauce prepared above using the cooking composition of the present invention are added 52 g of glucose, 12 g of maltose and 6 g of fructose to prepare a seasoning soy sauce for broiled chicken. Using the thus prepared seasoning soy sauce, a broiled chicken is prepared. The prepared broiled chicken has good flavor characteristic of a malt and looks fine with glaze. Further, the broiled chicken is very tasty with good body.

Experiment 5

To 15 ml of the cooking composition prepared in Example 2 are added 200 ml of salad oil and 100 ml of vinegar to prepare 315 ml of a base of a salad dressing. To 315 ml of the base of a salad dressing are added 4.5 g of salt and 1.1 g of pepper to prepare a salad dressing.

Substantially the same procedures as mentioned above are repeated to prepare 315 ml of a base of a salad dressing To the base of a salad dressing is added 400 ml of salad oil, 90 g of yolk, 15 g of salt, 15 g of mustard and 1.5 g of pepper, followed by mixing sufficiently to thereby obtain mayonnaise.

The salad dressing obtained above has not only good flavor and taste characteristic of a malt but also good body and sweetness by which the sourness is repressed. The mayonnaise obtained above also has good flavor and taste peculiar to a malt and good body.

Experiment 6

Using the cooking composition produced in Example 2, a seasoning soy sauce for pickling a meat is prepared according to the recipe as shown in Table 7.

TABLE 7

| Ingredient | Content (% by weight) |
| --- | --- |
| Cooking composition | 8.85 |
| Miso | 20.45 |

TABLE 7-continued

| Ingredient | Content (% by weight) |
| --- | --- |
| Soy sauce | 38.0 |
| Sugar | 4.44 |
| Mirin (seasoning sweet sake) | 10.0 |
| Garlic juice | 1.55 |
| Ginger juice | 1.55 |
| Hydrolysate of an animal protein | 2.0 |
| Lemon juice | 5.16 |
| Pokka Lemon ®[5] | 8.0 |

Note:
[5]manufactured and sold by Pokka Corporation, Japan

A meat is sufficiently pickled in the aboveobtained seasoning soy sauce and roasted. The roast meat is examined by a sensory test by a panel of 16 members. The sensory test is conducted by a twosample test method in which two samples are compared by testing and smelling.

On the other hand, as a control, a seasoning soy sauce is prepared in the same manner as mentioned above except that a commercially available beer (ethanol content: 4.5 v/v%) is used instead of the cooking composition of the present invention. Using the thus obtained seasoning soy sauce, a meat is pickled and roasted, and examined in the same manner as mentioned above.

The results are shown in Table 8.

TABLE 8

|  | Present invention | Control |
| --- | --- | --- |
| Meat is soft | 12* | 4 |
| Meat is crisp | 10 | 6 |
| Well balanced taste | 12 | 4 |
| Delicious | 13* | 3 |

Note:
*has the same meaning as in Table 2.

Experiment 7

Using the cooking composition produced in Example 2, a seasoning sauce for pickles is prepared according to the recipe shown in Table 9.

TABLE 9

| Ingredient | Content (% by weight) |
| --- | --- |
| Cooking composition | 3.0 |
| Salt | 4.5 |
| Sodium glutamate | 0.6 |
| Citric acid | 0.3 |
| Hydrolysate of an animal protein | 0.8 |
| Sodium acetate | 1.5 |
| Water | 89.3 |

A cucumber is pickled in the above-obtained seasoning sauce to prepare a pickle of cucumber. The pickle is examined by a sensory test by a panel of 16 members. The sensory test is conducted by a two-sample test method in which two sample are compared by tasting and smelling.

On the other hand, as a control, a seasoning sauce for pickles is prepared in the same manner as mentioned above except that a commercially available beer (ethanol content: 4.5 v/v%) is used instead of the cooking composition of the present invention. Using the thus obtained seasoning soy sauce, a cucumber is pickled and examined in the same manner a mentioned above.

TABLE 10

|  | Present invention | Control |
| --- | --- | --- |
| Good flavor and taste | 13* | 3 |
| Crisp | 7 | 6 |
| Well balanced taste | 10 | 6 |
| Delicious | 12 | 4 |

Note:
*has the same meaning as in Table 2.

What is claimed is:

1. A cooking composition produced by the fermentation of a wort comprising:
   (1) an ethanol content of 12 to about 20 v/v%,
   (2) a carbonyl compound content of about 10 to about 30 ppm in terms of the amount of acetaldehyde,
   (3) an ester content of about 30 to about 300 ppm in terms of the amount of ethyl acetate,
   (4) a total carbohydrate content of about 2 to about 10 w/v%, and
   (5) a total nitrogen content of about 500 to about 1500 ppm, and having the following properties:
   (6) an acidity of about 0.5 to about 4.0 in terms of the volume (ml) of 1/10 N NaOH required for neutralizing 10 ml of the cooking composition,
   (7) a bittering unit of 0 to about 10.0 B.U. in terms of the value as obtained by the EBC method,
   (8) a pH of about 4.0 to about 5.0, and
   (9) an optical density of about 0.45 to about 20.0 in terms of the value as obtained by the measurement at 430 nm using a 10mm-thick cell.

2. The cooking composition according to claim 1, which comprises:
   at least one additive selected from the group consisting of a seasoning, an edible organic acid and an edible oil.

3. The cooking composition according to claim 2, wherein the additive is a seasoning in which said seasoning is selected from the group consisting of salt, vinegar, miso, soy sauce, an amino acid and sugar.

4. The cooking composition according to claim 2, wherein the additive is an edible organic acid in which said edible organic acid is selected from the group consisting of acetic acid, citric acid, succinic acid and malic acid.

5. The cooking composition according to claim 2, wherein the additive is an edible oil in which said edible oil is sesame oil.

6. A cooking composition comprising:
   (1) an ethanol content of 12 to about 20 v/v%,
   (2) a carbonyl compound content of about 10 to about 30 ppm in terms of the amount of acetaldehyde,
   (3) an ester content of about 30 to about 300 ppm in terms of the amount of ethyl acetate,
   (4) a total carbohydrate content of about 2 to about 10 w/v%, and
   (5) a total nitrogen content of about 500 to about 1500 ppm, and having the following properties:
   (6) an acidity of about 0.5 to about 4.0 in terms of the volume (ml) of 1/10 N NaOH required for neutralizing 10 ml of the cooking composition,
   (7) a bittering unit of 0 to about 10.0 B.U. in terms of the value as obtained by the EBC method,
   (8) a pH of about 4.0 to about 5.0, and
   (9) an optical density of about 0.45 to about 20.0 in terms of the value as obtained by the measurement of 430 nm using a 10 mm-thick cell, which is obtained by a method comprising:
   (a) fermenting a wort with a yeast, while adding carbohydrate in an amount as can be assimilated by the employed amount and type of yeast, so that the alcohol content of a final fermented wort becomes at least 12 v/v%, obtaining a fermented wort, and
   (b) allowing the fermented wort to stand for a period sufficient to mature and stabilize the fermented wort.

7. The cooking composition according to claim 6, which comprises:
   at least one additive selected from the group consisting of a seasoning, an edible organic acid and an edible oil.

8. The cooking composition according to claim 7, wherein the additive is a seasoning in which said seasoning is selected from the group consisting of salt, vinegar, miso, soy sauce, an amino acid and sugar.

9. The cooking composition according to claim 7, wherein the additive is an edible organic acid selected from the group consisting of acetic acid, citric acid, succinic acid and malic acid.

10. The cooking composition according to claim 7, wherein the additive is sesame oil.

11. The cooking composition according to claim 6, wherein in step (a), carbohydrate is discontinuously added.

12. The cooking composition according to claim 6, wherein in step (a), carbohydrate is continuously added.

* * * * *

UNITED STATES PATENT AND TRADEMARK OFFICE
CERTIFICATE OF CORRECTION

PATENT NO. : 4,971,808
DATED : November 20, 1990
INVENTOR(S) : Kazushi Takeda and Kazumasa Kaisha It is certified that error appears in the above-identified patent and that said Letters Patent is hereby corrected as shown below:

ON TITLE PAGE: under (73) ASSIGNEE:
change "Asahi Kasei Kogyo Kabushiki Kaisha, Osaka Japan" to --Asahi Kasei Kogyo Kabushiki Kaisha, Osaka Japan; Asahi Breweries Ltd., Tokyo; Japan--

Signed and Sealed this

Tenth Day of March, 1992

*Attest:*

HARRY F. MANBECK, JR.

*Attesting Officer*      *Commissioner of Patents and Trademarks*